United States Patent
Ferdows

(10) Patent No.: US 6,415,620 B1
(45) Date of Patent: Jul. 9, 2002

(54) DUAL LOOP VEHICLE AIR CONDITIONING SYSTEM

(76) Inventor: Houshang K. Ferdows, 3605 Longwood Ave., Boulder, CO (US) 80303

( * ) Notice: Subject to any disclaimer, the term of this patent is extended or adjusted under 35 U.S.C. 154(b) by 0 days.

(21) Appl. No.: 09/686,176

(22) Filed: Oct. 12, 2000

(51) Int. Cl.$^7$ .................................................. B60H 1/32
(52) U.S. Cl. ................................... 62/244; 62/DIG. 16
(58) Field of Search .............................. 62/196.2, 244, 62/DIG. 16, 199, 200, 236

(56) References Cited

U.S. PATENT DOCUMENTS

| | | | | |
|---|---|---|---|---|
| 2,062,054 A | * | 11/1936 | Huggins | 62/199 |
| 2,155,484 A | * | 4/1939 | Bottlieb | 62/199 |
| 3,402,564 A | * | 9/1968 | Nussbaum | 62/196.2 |
| 3,545,222 A | * | 12/1970 | Petranek | 62/236 |
| 4,318,278 A | * | 3/1982 | Olson et al. | 62/196.2 |
| 4,607,497 A | | 8/1986 | Ferdows et al. | |
| 5,184,474 A | | 2/1993 | Ferdows | |
| 5,867,996 A | * | 2/1999 | Takano et al. | 62/236 |

* cited by examiner

Primary Examiner—William E. Tapolcai
(74) Attorney, Agent, or Firm—John E. Reilly

(57) ABSTRACT

A vehicle air conditioning system is specifically adaptable for mounting on the roof of a bus and is made up of condenser sections in which air is circulated across each of the condensor sections, a pair of evaporator sections with air circulated across the evaporator sections in the usual manner, and a pair of compressors are arranged in a double loop refrigerant system between the condenser and evaporator sections in such a way that each compressor delivers refrigerant to one of the condensor sections from which the refrigerant is then advanced to one or more evaporator coils in each of the evaporator sections.

21 Claims, 5 Drawing Sheets

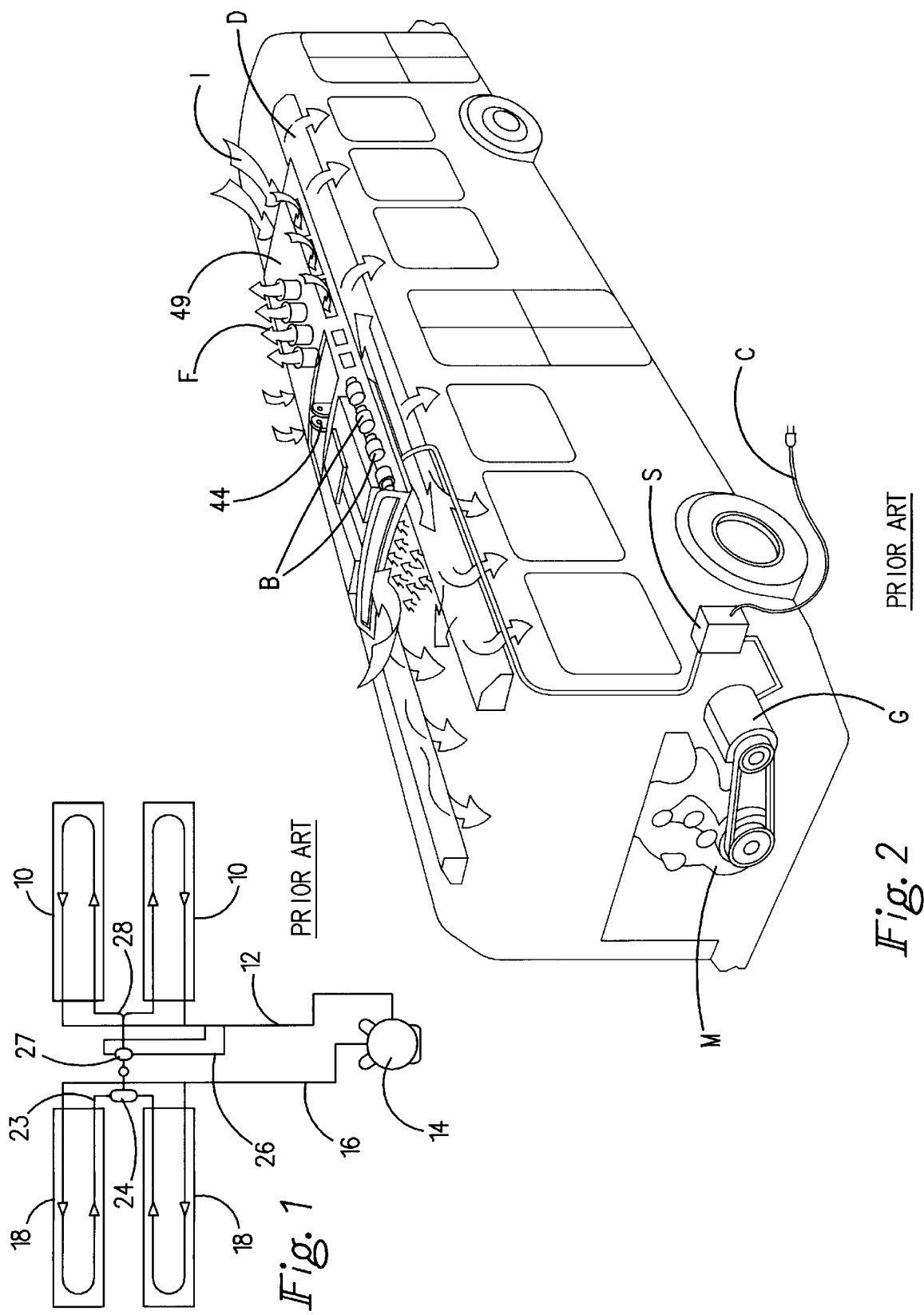

DUAL LOOP VEHICLE AIR CONDITIONING SYSTEM

BACKGROUND AND FIELD OF INVENTION

This invention relates to vehicle air conditioning systems; and more particularly relates to a novel and improved air conditioning system which employs a pair of compressors interconnected between condenser and evaporator sections in a unique and highly efficient manner.

Railway car air conditioning units customarily employ a high voltage power source that is capable of providing enough electrical power to run a pair of roof-mounted compressors between a pair of condensers and pair of evaporators. In such systems, however, the compressors are independently connected between one of the condensers and evaporators so as to in effect define a pair of single loop systems. In that way, if one of the single loop systems becomes inoperable, the other one would continue to deliver conditioned air to the interior of the railway car from the one evaporator section still in use.

The problems in air conditioning systems for vehicles other than trains or railway cars are somewhat different in that, for example, in a bus air conditioning system the generator does not have the same capacity as the power source used on railway cars and is not capable of providing as much electrical power; also, under peak load conditions, there may be insufficient power from the generator to keep the air conditioning system in operation. For this reason, in the past, no one has successfully devised a way of utilizing a dual loop system on a bus or other vehicle in which a generator is employed as the power source to continue to run the system under peak load conditions. Accordingly, in such systems which utilize a generator as a power source, it is desirable to employ a pair of compressors which individually require less power to maintain the air conditioning system in operation than the single compressor. As a result, if there is insufficient power generated to run both compressors, it is possible to use a single compressor at what amounts to a half or partial load and continue to supply conditioned air to the interior of the bus. Still further, it is highly desirable that the system for a bus be set up as a dual loop system so that the refrigerant lines from each compressor and condenser run through each of the evaporator coils and the compressors can be successively during the warm-up or initial start-up period to minimize the load on the compressors.

SUMMARY OF THE INVENTION

It is therefore an object of the present invention to provide for a novel and improved air conditioning system for automotive vehicles, such as, busses.

It is another object of the present invention to provide for a novel and improved roof or rear-mounted air conditioning system for automotive vehicles employing a unique form of refrigerant supply system between condensor and evaporator sections and which is specifically adaptable for use with a pair of compressor units.

A further object of the present invention is to provide in an air conditioning system for a novel and improved form of refrigerant supply arrangement between condenser and evaporator sections which enables operation at less than full capacity; and further wherein the system incorporates a pair of compressors so that, if one compressor should be out of action, the remaining compressor will continue to supply conditioned air through the same outlets as when the system was fully operational.

A still further object of the present invention is to provide a roof-mounted air conditioning system for busses or other automotive vehicles including a pair of roof-mounted compressors interposed between a pair of condensers and evaporators and wherein each compressor is characterized by supplying refrigerant to each of the evaporator sections independently of one another.

In accordance with the present invention, there has been devised an air conditioning system adapted for mounting on a vehicle in which a pair of condenser sections each includes a condenser coil, first means for circulating air across each of the condenser coils, a pair of evaporator sections, a and air circulating ducts for directing conditioned air into the vehicle, the improvement comprising a pair of compressors, each of the compressors including a first refrigerant line for delivering refrigerant to one of the condenser coils and a second refrigerant line for delivering refrigerant from the evaporator coils in each of the evaporator sections to one of the compressors, each of the evaporator sections including a plurality of evaporator coils, the evaporator coils in each evaporator section being substantially coextensive with one another and with said ducts, and a third refrigerant delivery line extending from each of the condenser coils to one of the evaporator coils in each of the evaporator sections.

In a preferred form thereof, each of the compressors includes a separate motor drive whereby each of the compressors is operative to deliver refrigerant from one of the condenser coils, in the event that one of the compressors is disabled, to at least one of the evaporator coils in each of the evaporator sections. The refrigerant delivered from each compressor to each of the condensor coils is a high pressure vapor and from each of the evaporator coils to each of the compressors is a low pressure vapor while the refrigerant delivered from each of the condenser coils to the respective evaporator coils is a high pressure liquid.

Most desirably, the condenser and evaporator sections are modular roof-mounted sections, and the compressors either may be rear-mounted directly adjacent to the generator or roof-mounted between the condensor and evaporator sections. In either mounting, each compressor is capable of supplying refrigerant to each of the evaporator sections independently of the other compressor in the event that one of the compressors should become incapacitated.

There has been outlined the more salient features of the invention in order that the detailed description thereof that follows may be better understood, and in order that the present contribution to the art may be better appreciated. There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a schematic illustration of a prior art single loop air conditioning system for vehicles;

FIG. 2 is a perspective view of a prior art air conditioning system mounted on the roof of a bus;

DETAILED DESCRIPTION OF PREFERRED EMBODIMENT

Figure 3:
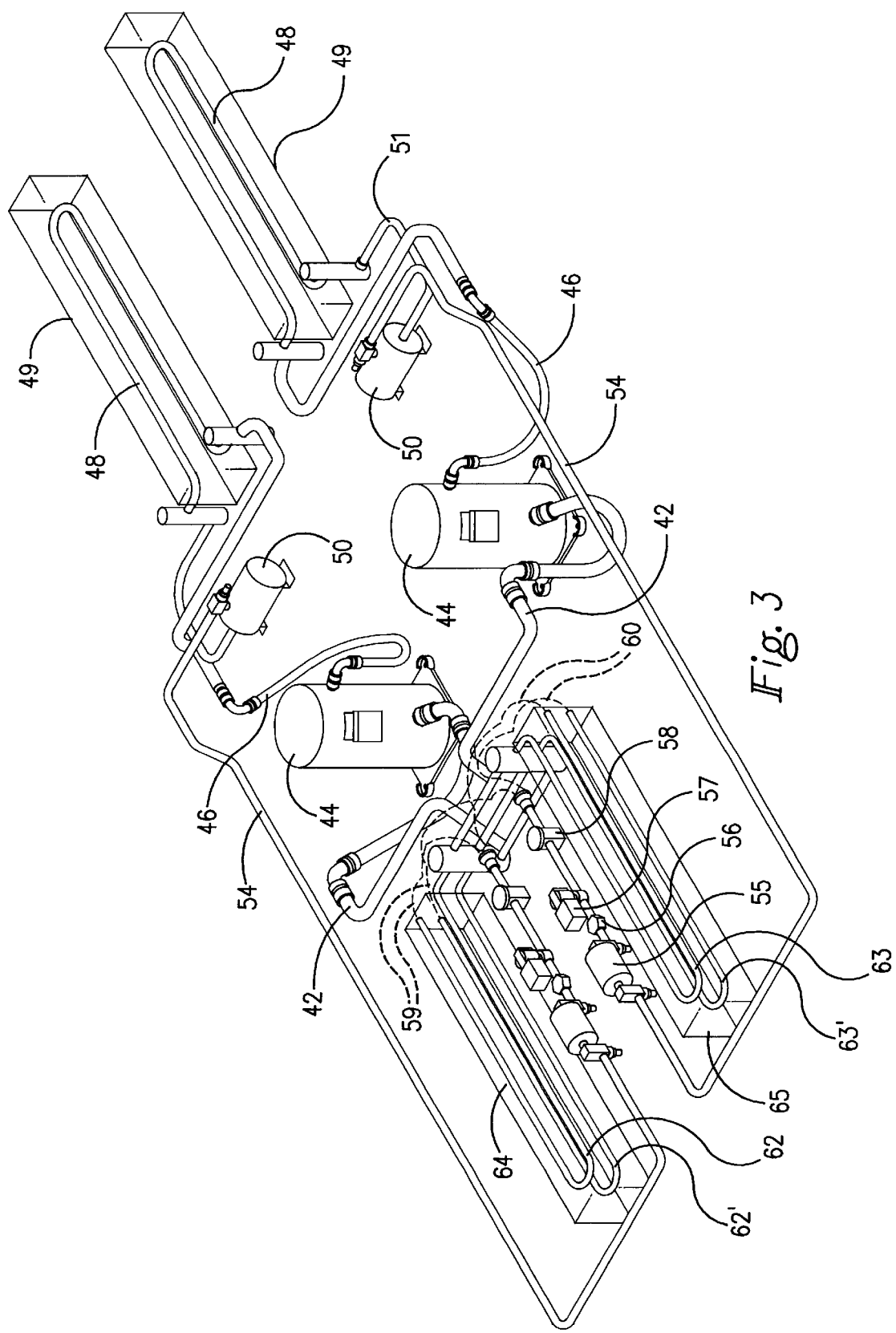
FIG. 3 is a schematic illustration of a preferred form of air conditioning system for busses.

A prior art air conditioning system for busses is schematically shown in FIGS. 1 and 2 in which FREON® or other refrigerant in its gaseous state is drawn from evaporator coils 10 through a suction line 12 into compressor 14 which is driven off of a bus engine M. During compression, the cool FREON® gas undergoes both an increase in temperature and pressure and is then discharged by the compressor through line 16 into condenser coils 18. As the gas circulates internally through the coils 18, ambient air is drawn through the coil fins by a combination of centrally located condenser fans F and side air inlets I, as shown in FIG. 2. The FREON® gas is liquefied as the air is drawn across the condenser coils 18 and by the increased pressure of the gas created by the compressor 14. Any heat given up by the gas in its conversion into liquid form is expelled by the condenser fans F. The, liquid refrigerant from the condenser coils 18 is delivered into a receiver/dryer 24 via the refrigerant lines 23 from the condenser coils 18. The refrigerant then advances into the evaporator section 10 via liquid line 26 which is attached to the expansion valve 27, the latter controlling the amount of liquid FREON® entering the two evaporator coils 10 for coolant vaporization. Expansion valve 27 opens and closes in accordance with the temperature and pressure at the evaporator outlet so as to control the amount of FREON® entering the evaporator coils. Here, the FREON® enters the coils 10 through inlet lines 28 so as to insure that the FREON® is distributed evenly within the coils 10. The receiver/dryer 24 acts as a cooling chamber for the hot liquid refrigerant as well as a mixing chamber for oil and refrigerant. In addition, the refrigerant 24 is stored in the receiver until needed by the evaporators while being filtered and any moisture dried from the system. The expansion valve 27 controls the amount of liquid FREON® admitted to the evaporator coils 10 via branch lines 28, and the internal pressure of the coils 10 is reduced causing the FREON® to absorb heat from the air passing over the evaporator coils 10 as it is vaporized. The refrigerant gas is then returned to the compressor 14 via suction line 12 to repeat the cycle as described.

The air movement across the evaporator coils 10 is controlled by evaporator blowers B outboard of the coils and which communicate with air circulating ducts D along opposite sides of the bus and leading into the bus interior, as shown in FIG. 2. Representative of such a circulating system is that illustrated and described in U.S. Pat. No. 4,607,497 entitled ROOF-MOUNTED AIR CONDITIONER SYSTEM HAVING MODULAR EVAPORATOR AND CONDENSOR UNITS and U.S. Pat. No. 5,184,474 for ROOF-MOUNTED AIR CONDITIONING SYSTEM WITH BUILT-IN COMPRESSOR, both assigned to the assignee of this invention. In the single loop system as hereinabove described, if the compressor should become overloaded or break down, the interior of the bus will be completely deprived of conditioned air.

In accordance with the present invention, the preferred form illustrated in FIG. 3 operates as in the prior art version of FIGS. 1 and 2 to deliver refrigerant in vaporized form from evaporator coils to be described through separate suction lines 42 into a pair of compressors 44. During compression, the relatively low temperature refrigerant gas undergoes an increase in temperature and pressure prior to discharge through lines 46 leading to each of a pair of condenser coils 48 in condensor unit 49. As the high pressure vapor circulates through the coils 48, ambient air is drawn across the coil fins by a combination of the centrally located condenser fans F and side air inlets I as illustrated in FIG. 2.

The refrigerant gas is condensed as a result of the reduction in temperature caused by passage of the air across the condenser coils 48 as well as the increased pressure of the vapor created by the compressors 44. The liquid refrigerant from the coils 48 is delivered into receiver tanks 50 through discharge lines 51 leading from each condenser. The refrigerant is then delivered from the receiver tanks 50 through separate delivery lines 54, each of the lines 54 provided with conventional filter dryer 55, sight glass 56, solenoid valve 57 and expansion valve 58. As in the prior art form, the expansion valve 58 in each line 54 opens and closes in accordance with the temperature and pressure at the evaporator outlet so as to control the amount of refrigerant entering the evaporator sections. An important feature of the present invention is that capillary tubes define branch lines 59 and 60 which extend from each of the refrigerant lines 54 at the outlet sides of the expansion valves 58 into one or more evaporator coil 62 or 62' in one evaporator section 64, and coils 63 or 63' in the second evaporator section 65. Referring to FIG. 2 once again as well as to FIG. 4, the evaporator blowers B serve to draw air across the evaporator coils 62, 62' and 63, 63' resulting in an increase in temperature of the refrigerant sufficient to cause it to vaporize and cool the air circulating thereacross prior to entry through the air circulating ducts D.

Figure 5:
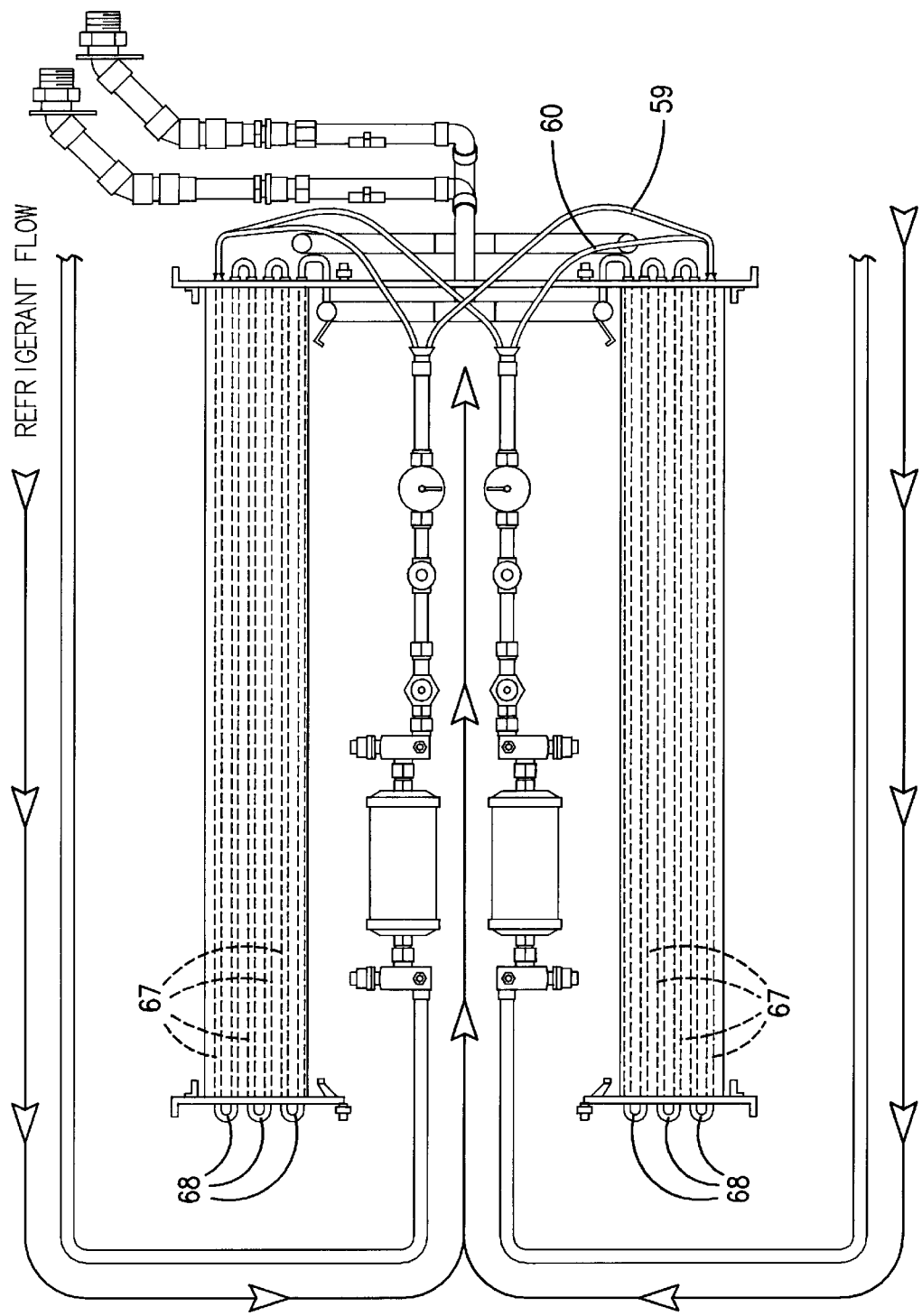
FIG. 5 is a plan view in more detail of the refrigerant supply lines into each of the evaporator sections of the system shown in FIGS. 3 and 4.
Figure 6:
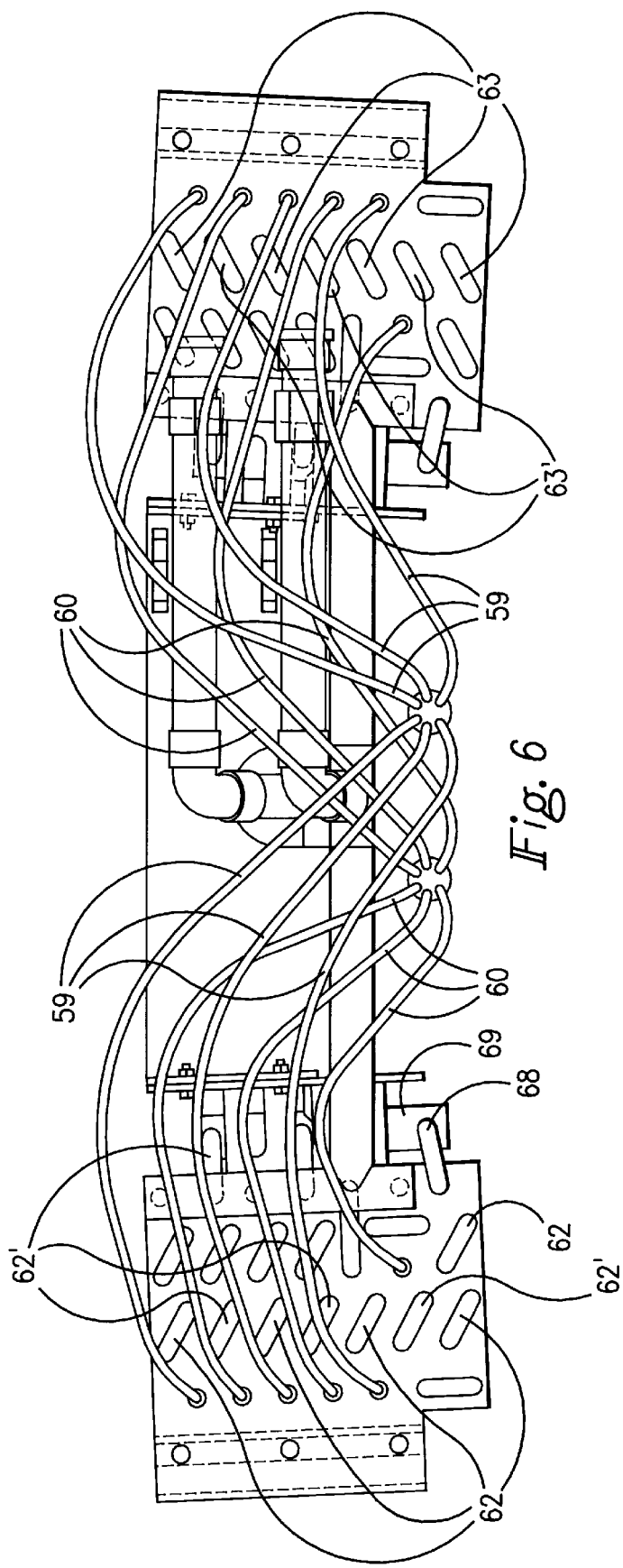
FIG. 6 is an end view of the evaporator sections shown in FIG. 6.

Preferably as shown in FIGS. 5 and 6, each of the evaporator coils 62, 62' and 63, 63' is mounted for extension lengthwise through a series of fins which make up the respective elongated evaporator sections 64 and 65 so as to promote maximum exposure to the air and most effective cooling of the air prior to circulation into the interior of the bus. Thus, each of the coils 62 and 63 in a respective evaporator section 64 and 65 is connected via branch lines 59 to one of the condenser sections 49, and each of the coils 62' and 63' is connected via branch lines 60 to the condenser unit 49 for the other compressor. In addition, the coils 62' and 63' are arranged in vertically spaced relation to the coils 62 and 63, respectively. Each coil 62, 62' and 63, 63' is comprised of longitudinally extending straight tubes 67 arranged in spaced parallel relation across the width of each evaporator section and interconnected by generally U-shaped returns 68, and the innermost returns 68 terminate in manifolds 69 in accordance with well-known practice and then returns to their respective compressor 44 via the return lines 42.

In the preferred form, scroll or piston compressors are utilized. In a typical application, a pair of 5 ton scroll compressors each with a built-in motor would be utilized to take the place of a single 10 ton compressor. It will be evident, however, that different size or load compressors may be employed, such as, for example, 2.5 ton, 6 or 7.5 ton depending upon cooling requirements.

In operation, each of the expansion valves 58 opens and closes in accordance with the temperature and pressure at the evaporator outlet so as to control the amount of refrigerant entering the evaporator coils 62, 62' and 63, 63'. Each dryer 55 operates as a drying and cleaning chamber for the liquid refrigerant from the condensors as well as a mixing chamber for oil and refrigerant. The expansion valves 58 also control the amount of liquid refrigerant admitted to the evaporator coils 62, 62' and 63, 63', and the internal pressure of the refrigerant is reduced so as to absorb heat from the air passing over the coils as it is vaporized.

In practice, the compressors 44 are powered by a single generator G which is driven off of the engine M. If there is insufficient power generated by the generator G to run both compressors 44, only one of the compressors is operated at a reduced power level to that of both compressors but will nevertheless continue to supply conditioned air through both evaporator sections 64 and 65 from the single compressor. This is in contradistinction to the single loop system in which each refrigerant line from the condenser circulates refrigerant only through one evaporator section.

Among other advantages in utilizing a pair of compressors in place of a single compressor is that when an automotive vehicle, such as, a bus has been at rest and the engine turned off on hotter days, it is possible to start up each compressor in succession to gradually restore air conditioning to the interior of the bus and in this way reduce the load requirements and electricity required at the beginning. A switch port S as shown in FIG. 2 is provided with a power cord C which enables plug-in to an electrical outlet for auxiliary power to initiate start-up of the air comfort system and thereby avoid using fuel during the start-up period prior to actual starting of the bus. The switch ports will then enable switching over to the generator once the bus interior is cooled to the desired temperature level in order to start up the bus.

Figure 4:
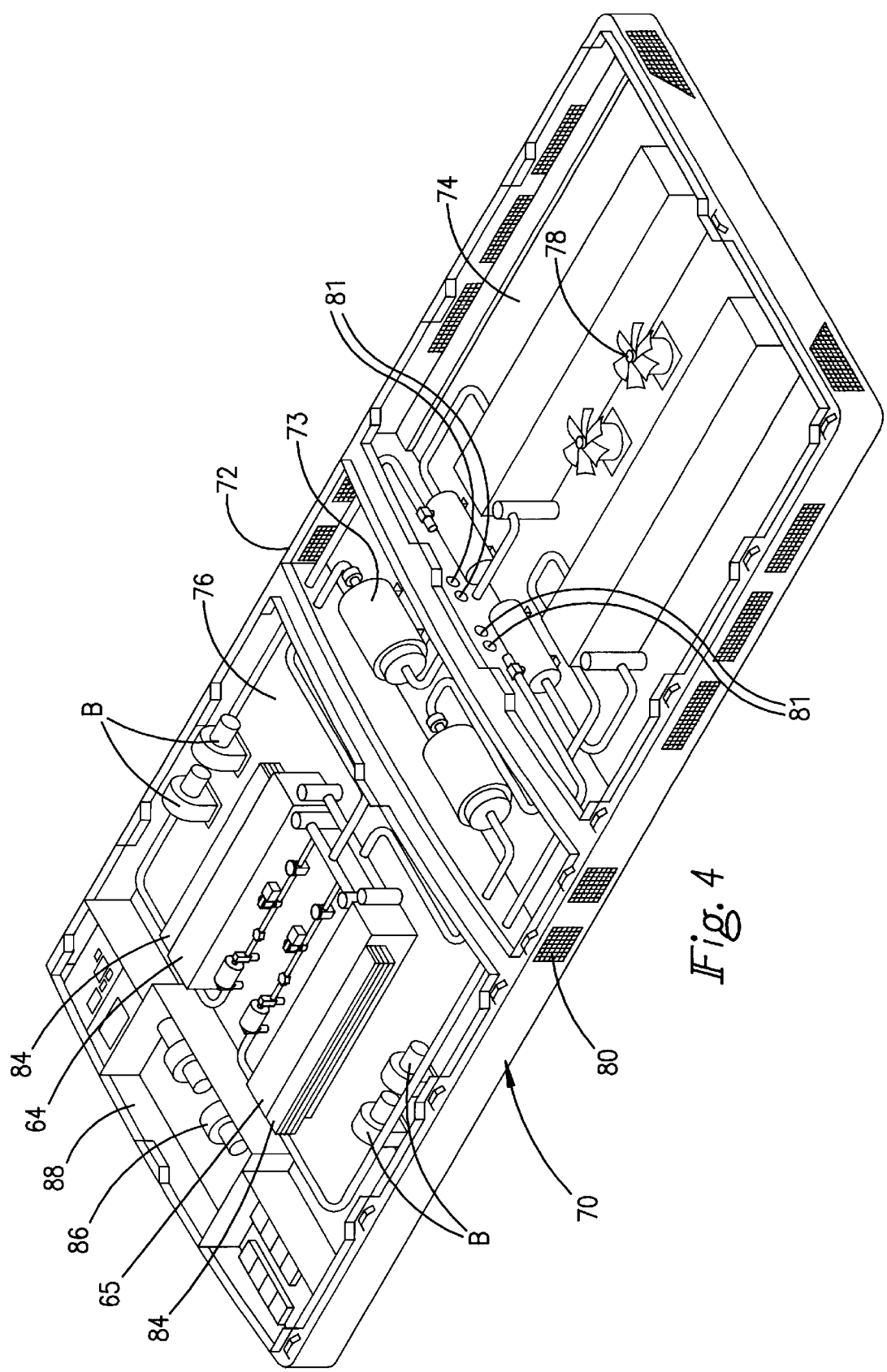
FIG. 4 is a perspective view of the preferred form of air conditioning system for busses including a pair of roof-mounted compressors between the evaporator and condenser sections of the system.

In a modified form of invention as shown in FIG. 4, a roof-mounted air conditioning system 70 includes a built-in compressor compartment 72 containing a pair of compressors 73 in juxtaposed relation to one another between the condenser section 74 and evaporator section 76. Fans 78 in the condenser section 74 induce the flow of air through the compressor compartment 72 and into the condenser section 74 through vents 80 in opposite side walls of the compressor compartment 72 as well as additional vents 81 in a partition wall between the compressor section 72 and condenser section 74. In this way, the air directed into the compressor compartment 72 will flow directly across the condenser coils 75 in the condenser section 74 and through discharge openings, not shown, in the cover of the condenser section 74. The vents 81 in the partition wall may be louvered in order to regulate the relative amount of air drawn through the air intake grilles 80 to the total air flow so as to avoid forcing too much air and moisture over the compressor motors. The refrigeration cycle is identical to that described and shown in FIG. 3.

As further illustrated in FIG. 4, electrical heaters 84 extend along opposite sides of the evaporator sections 64 and 65 to heat the air that is drawn across the evaporator sections by the blowers B for circulation into the bus interior. The twin compressors 73 offer a unique ability to gradually cool the air circulated by successive activation of the compressors 73 as the temperature increases above the set point. For example, assuming that the set point is established at 68° F. and the temperature in the bus interior should increase slightly above the set point, only one of the compressors 73 need be activated to reduce the temperature. If the temperature increase is more substantial then of course both compressors 73 would be activated. Conversely, if the temperature should drop below the set point, only a selected number of heating elements in each bank of heaters 84 need be activated to compensate for the slight reduction in temperature. The foregoing is given more for the purpose of illustration and not limitation in demonstrating the effectiveness and efficiency in utilizing a pair of compressors in place of a single compressor to minimize the load placed on the generator for different given temperature conditions as well as to enable utilization of an auxiliary power source, such as, an electrical outlet instead of costly fuel consumption during the warm-up period. In addition, pressurized fresh air blowers 86 in a filter box 88 can be activated electrically, to assist in pressurizing when the bus is in motion.

It is therefore to be understood that the above and other modifications and changes may be made in the construction and arrangement of parts comprising the preferred and alternate forms of invention without departing from the spirit and scope thereof as defined by the appended claims and reasonable equivalents thereof.

I claim:

1. The combination with an automotive vehicle having a generator of an air conditioning system mounted on said vehicle wherein a pair of condensor sections each includes a condensor coil, first means for circulating air across each of said condensor coils, a pair of evaporator sections, each of said evaporator sections including air circulating ducts along opposite sides of said vehicle for directing conditioned air into said vehicle;

a pair of compressors operatively connected to said generator, each of said compressors including a first refrigerant line for delivering refrigerant to one of said condensor coils and a second refrigerant line for delivering refrigerant from each of said evaporator sections to one of said compressors, and a plurality of evaporator coils in each said evaporator section, said evaporator coils in each said evaporator section being substantially coextensive with one another and with said ducts; and refrigerant delivery means extending from each of said condensor coils to one of said evaporator coils in each of said evaporator sections for circulating refrigerant through said one of said evaporator coils when said compressor associated with said condensor section is in operation and wherein the conditioned air is uniformly distributed across each of said evaporator sections into said ducts by each of said compressors.

2. In an air conditioning system according to claim 1, wherein each of said compressors includes separate motor drive means whereby each of said compressors is operative to deliver refrigerant to one of said condensor coils in the event that the other of said compressors is disabled.

3. In an air conditioning system according to claim 2 wherein said refrigerant delivery means from each of said condenser coils is operative to deliver refrigerant simultaneously to said one of said evaporator coils in each of said evaporator sections.

4. In an air conditioning system according to claim 3 wherein the refrigerant delivered from each said compressor to an associated of said condenser coils is a high pressure vapor.

5. In an air conditioning system according to claim 3 wherein the refrigerant from each of said evaporator coils to each of said compressors is a low pressure vapor.

6. In an air conditioning system according to claim 3 wherein refrigerant from each of said condenser coils to said one of said evaporator coils is a high pressure liquid.

7. In an air conditioning system according to claim 1 wherein said refrigerant delivery means includes capillary tubes connected to said evaporator coils in each of said evaporator sections.

8. In an air conditioning system according to claim 7 wherein said evaporator sections are elongated and said evaporator coils extend horizontally through said evaporator sections in a series of lengths having generally U-shaped returns interconnecting adjacent of said lengths at opposite ends thereof.

9. In an air conditioning system according to claim 8 wherein said evaporator coils are disposed in vertically spaced relation to one another within each of said evaporator sections.

10. In an air conditioning system according to claim 7 wherein each of said evaporator coils extends lengthwise of said evaporator section.

11. In an air conditioning system according to claim 7 wherein said refrigerant delivery means includes an expansion valve for controlling the flow capacity of the refrigerant through each of said evaporator coils.

12. The combination with an automotive vehicle having a generator of an air conditioning system mounted on a roof of a vehicle wherein a pair of condenser sections each includes a condensor coil, first means for circulating air across each of said condensor coils, air circulating ducts along opposite sides of said vehicle extending along opposite sides of said roof, and a pair of evaporator sections coextensive with said ducts;

a pair of compressors operatively connected to said generator and being mounted on said roof between said condensor sections and said evaporator sections, each of said compressors including a first refrigerant line for delivering refrigerant to one of said condensor coils and a second refrigerant line for delivering refrigerant from each of said evaporator sections to one of said compressors, and a plurality of evaporator coils in each said evaporator section, said evaporator coils in each said evaporator section being substantially coextensive with one another and with said ducts; and a third refrigerant delivery line extending from each of said condensor coils to one of said evaporator coils in each of said evaporator sections for circulating refrigerant therethrough and each of said compressors includes a separate motor drive whereby each of said compressors is operative to deliver refrigerant through one of said condensor coils independently of the other of said compressors and wherein the conditioned air is uniformly distributed across each of said evaporator sections into said ducts by each of said compressors.

13. In an air conditioning system according to claim 12 wherein each of said condenser coils is operative to deliver refrigerant via said third refrigerant line to at least one of said evaporator coils in each of said evaporators.

14. In an air conditioning system according to claim 13 wherein the refrigerant delivered from said compressor to each of said condenser coils is a high pressure vapor, and the refrigerant from each of said evaporator coils to each of said compressors is a low pressure vapor.

15. In an air conditioning system according to claim 14 wherein refrigerant from each of said condenser coils to said evaporator coils is in a high pressure liquid state.

16. In an air conditioning system according to claim 11 wherein said refrigerant delivery means includes capillary tubes connected to one of said evaporator coils in each of said evaporator sections.

17. In an air conditioning system according to claim 16 wherein said evaporator sections are elongated and each of said evaporator coils extends horizontally through said evaporator section in a series of lengths having generally U-shaped returns interconnecting adjacent of said lengths at opposite ends thereof.

18. In an air conditioning system according to claim 17 wherein said evaporator coils are disposed in vertically spaced relation to one another within each of said evaporator sections.

19. In an air conditioning system according to claim 11 wherein each of said evaporator coils extends lengthwise of said evaporator section.

20. In an air conditioning system adapted for roof-mounting on a vehicle wherein a pair of condensor sections each includes a condenser coil, first means for circulating air across each of said condensor coils, a pair of evaporator sections, each of said evaporator sections including a plurality of evaporator coils, air circulating ducts for directing air from said evaporator coils into the interior of said vehicle, the improvement comprising:

a pair of compressors interposed between said condensor and evaporator sections, each of said compressors including a first refrigerant line for delivering refrigerant to one of said condenser coils and a second refrigerant line for delivering refrigerant from said evaporator coils in each of said evaporator sections to one of said compressors;

a third refrigerant delivery line extending from each of said condensor coils to one of said evaporator coils in each of said evaporator sections for circulating refrigerant therethrough and each of said compressors includes a separate motor drive whereby each of said compressors is operative to deliver refrigerant through one of said condenser coils independently of the other of said compressors; and said evaporator coils extend horizontally through said evaporator sections in a series of lengths having generally U-shaped returns interconnecting adjacent of said lengths at opposite ends thereof, said evaporator coils disposed in vertically spaced relation to one another within each of said evaporator sections, and said refrigerant delivery means including capillary tubes connected to each of said evaporator coils, and wherein said vehicle includes an engine and a generator driven off of said engine together with an auxiliary power source for supplying electrical power to said compressors, and switching means for activating each of said compressors in succession.

21. In an air conditioning system according to claim 20 wherein each of said evaporator sections includes electrical heater means in the path of air flow from said evaporator coils and said air circulating ducts for heating the air being circulated to the interior of said vehicle, said switching means being operative to selectively connect said auxiliary power source to said electrical heaters.

* * * * *